Aug. 13, 1929. R. E. MITTON Re. 17,402

AIR VALVE

Original Filed Dec. 8, 1925

Inventor

Robert E. Mitton

By J. M. Thomas

Attorney

Reissued Aug. 13, 1929.

Re. 17,402

UNITED STATES PATENT OFFICE.

ROBERT E. MITTON, OF SALT LAKE CITY, UTAH, ASSIGNOR, BY MESNE ASSIGNMENTS, TO INTERNATIONAL AIR BRAKE COMPANY.

AIR VALVE.

Original No. 1,599,619, dated September 14, 1926, Serial No. 74,204, filed December 8, 1925. Application for reissue filed August 29, 1928. Serial No. 302,878.

My invention relates to valves and has for its object to provide a new and efficient automatic valve for controlling air.

A further object is to provide a valve whereby the pressure of compressed air through air lines, in either direction, may be automatically maintained, released or applied to control mechanical movements and to overcome momentum, and particularly to provide a quick acting automatic control valve for air brake mechanism on automobiles and other conveyances. Also to control the distribution of power to such conveyances.

These objects I accomplish with the device illustrated in the accompanying drawings in which similar letters and numerals of reference indicate like parts throughout the several views and as described in the specification forming a part of this application and pointed out in the appended claims, it being understood that slight changes and modifications may be made in construction without departing from the spirit of the invention as set out in the claims.

Figure 1:
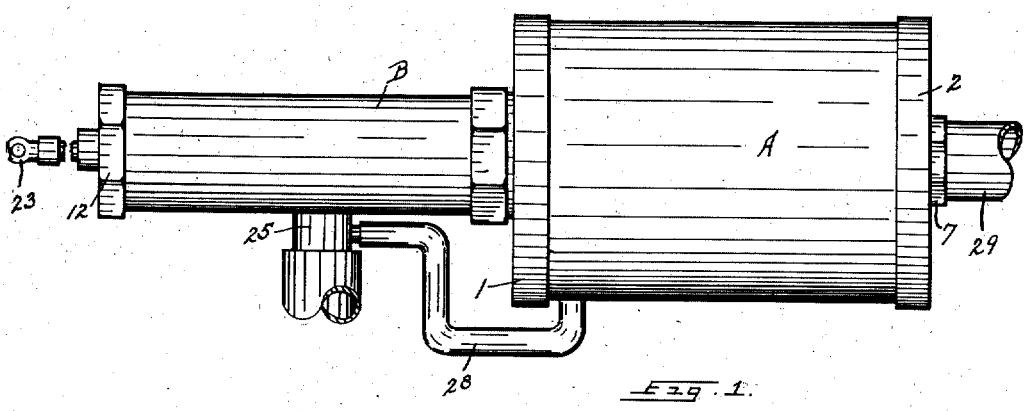
Figure 2:
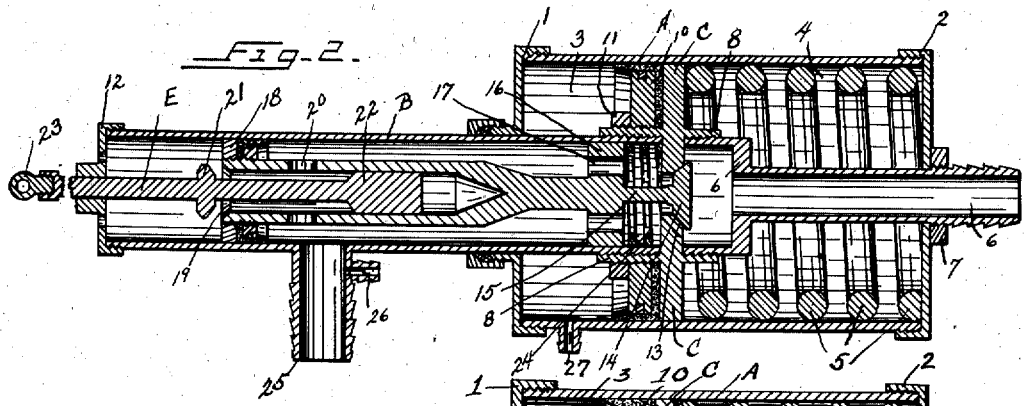
Figure 3:
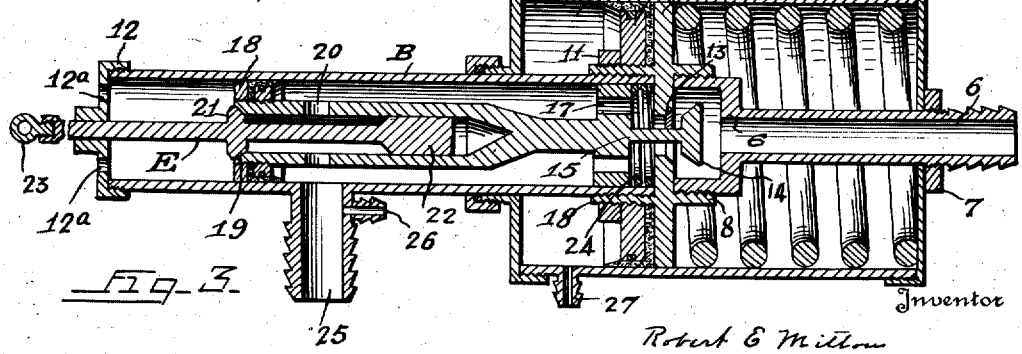

In the drawings in which I have shown the best and most substantial embodiment of my invention, Figure 1 is an elevation of my valve with parts cut away. Figure 2 is a longitudinal diametrical section of the valve. Figure 3 is the same section as shown in Figure 2 with the valve 21 closed and the valve 14 open.

In the drawings I have shown the major portion of my valve enclosed in a cylindrical casing A, which has closure caps 1 and 2 screwed on the ends thereof. A hollow piston rod B is slidably carried in the casing A, which rod and its connections form the other portion of my valve. On one end of said piston rod B a closure cap 12 is screwed having ports 12[a] bored therethrough to allow passage of air, when air escapement is required in the operation of the valve. The other end of the piston rod B is fastened centrally in a piston C which is operatively carried in the casing A and divides the interior of said casing A into two compartments 3 and 4. A main spiral spring 5 is carried in compartment 4, with one end of the spring bearing against the piston C and the other end against the closure cap 2. An inner casing 6 is concentrically secured to one face of the piston C with the free end portion passed axially through the closure cap 2. A jam nut 7 is screwed on the casing 6 to limit the movement of the piston C and casing 6 in one direction while allowing them to move in the opposite direction, and one end of a flexible air tube 29 is secured on the free end of the casing 6. A cylindrical or sleeve nut 8 is integrally formed on and concentric with said piston C within which flange or sleeve nut 8 the end portion of said casing is screwed, and in the opposite portion of said flange or sleeve nut 8 is screwed the end of the piston rod B. The end of the sleeve nut 8 in which the piston rod B is screwed is externally threaded to receive the packing washer 10 and the jam nut 11 which holds the washer and packing in place on the piston assembly C. The said piston C is centrally bored and cut to form a valve seat 13 in which the valve 14 normally seats. The valve 14 has a valve stem 15 secured centrally thereto and said stem is enlarged at 16 to form a guide which is longitudinally slidable in the said piston rod B. Holes 17 are provided in the enlarged guide 16 to allow passage of air therethrough. The other end portion of said valve stem 15 is externally threaded to receive the suitably packed piston head 18 which is the same size as the guide 16 and is also longitudinally slidable in the said piston rod B and which piston head 18 guides the valve stem 15 longitudinally within the said piston rod B. The said valve stem 15 is centrally bored for a portion of its length to receive the valve stem E with the edge of the bore chamfered to form a valve seat 19. Ports 20 are bored in the wall of the internally bored portion of the said valve stem 15 to allow passage of air therethrough. A valve 21 is formed on the valve stem E and when the stem is operated the valve 21 engages in the valve seat 19. One end portion of the said valve stem E is enlarged to form a guide 22 which is longitudinally slidable in the internally bored portion of the valve stem 15 and which acts as a support for the one end of the valve stem E. The other end of the said valve stem E is slidably carried in the closure cap 12 of the piston rod B, and the extreme end of said valve stem E is enlarged and internally threaded to receive an eye bolt 23. The said eye bolt 23 is provided so that a lever may be connected therewith for operating the valves 21 and 14. Thus said rod E forms a control element for the valve member 21, and the eye bolt 23 forms a control member carried by said rod exteriorly of the parts A and B. A spiral spring 24 is carried within the said piston rod B between the guide 16 and the piston C to normally hold the valve 14 in its seat 13. An air connection 25 is provided on one side of the said piston rod B to which a brake line may be attached to carry the air to the desired places of use. A branch air connection 26 is provided on the side of 25 and a similar connection 27 is provided in the side of the chamber 3 of the casing A to which connections a flexible air tube 28 is attached to carry back-pressure of air to the chamber 3 from the air connection 25.

In the operation of my valve, pressure is applied at the eye bolt 23 in order to move the stem E longitudinally. This operation results in the closing of the exhaust valve 21 and the opening of the intake valve 14, which allows air to enter at the intake valve 14 and flow past or around the same, through the ports 17 in the guide 16 and into the tubular piston rod B, and against the piston head 18, through the ports 20 of the valve stem 15 and against the closure side of the exhaust valve 21, out through the passage 25 to the mechanism to be operated, and also by way of the flexible connection 28 into the automatic chamber 3. This produces a downward pressure on the piston C, with its valve seat 13, and shuts off the air flow when sufficient pressure is induced to compress the main spring 5 far enough to allow the valve 14 to seat. At the same time a restraining pressure is thrown against piston 18 in the hollow piston rod B in order to prevent the involuntary tendency to over apply the pressure by the receding action of the piston, C. It is evident that should a further movement of the valve mechanism be made at this time, that additional pressure would be admitted, and automatically cut off, according to the extent of the movements of operation as outlined above. The release or decrease of pressure is secured or accomplished by merely raising the exhaust valve 21 out of its seat, whereupon the air of the entire system will escape through the said valves and out through the ports 12[a] in the cap 12 of the piston rod B. It will be seen that the reduction of pressure thus brought about in the chamber 3 will cause the piston C to be raised by the spring expansion beneath it, carrying the closed intake valve 14 with it, and keeping the exhaust valve seat 19 which is chamfered in the head of the tubular valve stem 15 in close proximity to the receding valve head 21, so that should the raising of said exhaust valve 21 cease, then the release of pressure would instantly cease, because of the seating of the valve 21 by the pressure of the main spring 5. It is also obvious that any leak of the applied air would be automatically replaced by the main spring 5 opening the intake valve 14, and allowing air to enter and replace the leakage, and by such replacement cause a movement of the piston C until the intake valve 14 would again be closed, the pressure on the operated valve assembly at the eye bolt 23 remaining constant. The graduation of pressure is determined by the extent of movement at the eye bolt 23 and the tension of the main spring 5. It is to be noted that the casing A and piston B together form a housing for the two pistons and that in said housing an air pressure chamber is formed between said pistons.

Having thus described my invention, and its operation I desire to secure by Letters Patent, and claim:

1. An automatic control valve comprising a casing; a piston slidably carried in said casing; exhaust and intake valves operable by the movements of the piston; means to manually operate said valves in one direction; means to convey air to said valves; a spring to regulate the movement of said piston; against the tension of which spring the piston is movable by the involved air pressure; means to utilize the movement of the piston to operate the said valves to automatically regulate the amount of air pressure in said casing.

2. An air valve comprising a casing; a piston operable within said casing; a spring to regulate the movements of said piston; a hollow piston rod attached to said piston; valves operable within said piston rod; means to convey compressed air against the head of said piston; means to manually operate the valves to allow varying air pressures to pass them.

3. An air valve comprising a casing; a piston operable therein and dividing the interior of the casing into two compartments; a spring in one compartment to regulate the movement of said piston; a hollow piston rod attached at one end to said piston; a flexible connection between the casing and piston rod; coacting valve stems operable in said piston rod; a valve on each of said stems either of which is adapted to close when the other is open; and means to direct compressed air through said casing and hollow rod in either direction.

4. An air control mechanism comprising a casing, a piston operable therein and having a central valve seat opening; a spring to regulate the movement of said piston; a hollow piston rod having air ports in its wall and with one end attached to said piston; coacting valves operable in said piston rod either of which is adapted to open when the other is closed; and means to direct compressed air in either direction through said casing and piston rod.

5. An air control mechanism comprising a casing having a hole in its side wall; a piston operable in the casing; a spiral spring carried in the casing adapted to be compressed by said piston; a hollow piston rod secured to one face of said piston and having an air port in its wall; an interior casing secured on the other face of said piston and movable therewith; valve stems operable in said piston rod, a valve on each of said stems either of which is closed when the other is opened; a flexible connection between the interiors of the first mentioned casing and said piston rod; and means to direct compressed air through the first mentioned casing and said piston rod.

6. An automatic control valve comprising a casing; a piston operable therein having a central valve seat; a main spring to regulate the movement of said piston; a piston rod secured to said piston, and tubular in form with air ports in its wall; a flexible tube connecting a chamber within said casing with the interior of said piston rod; valve stems operable in the piston rod; intake and exhaust valve heads carried on the stems; a spring in said piston rod to hold the intake valve normally seated in said central valve seat; means to manually operate the said valves; and means to direct compressed air past the intake valve.

7. An air valve comprising a casing, a piston operable within said casing, a hollow piston rod attached to said piston, a valve operable within said piston rod, means to convey compressed air against one side of said piston, a spring acting upon said piston in opposition to the pressure of such air, and a common means for manually regulating the supply of air to and its exhaust from said casing.

8. An air valve comprising a casing, a piston operable therein and dividing the interior of the casing into two compartments, a spring in one of said compartments to regulate the movement of said piston, a hollow piston rod attached to said piston, and in communication with the other of said compartments, coacting valve stems operable in said piston rod, a valve on each of said stems, either of which is adapted to close when the other is open, and means to direct compressed air through said casing and hollow rod in either direction.

9. An air control mechanism, comprising a casing having a hole in its side wall, a piston operable in the casing, a spiral spring in said casing adapted to be compressed by the piston, a hollow piston rod secured to the piston at one side thereof, having communication with said casing and the same side of said piston and having an air exhaust port, means for delivering air to said casing through said piston, coacting valve stems operable in said piston rod, a valve on each of said stems either of which is closed when the other is opened, and means to direct compressed air through said casing and said piston rod.

10. An automatic control valve comprising a casing, a piston operable therein having a central valve seat, a spring to regulate the movement of said piston, a tubular piston rod secured to said piston, having communication with said casing and formed with an air exhaust port, a pair of coacting valve stems operable in said piston rod, an intake valve carried by one of said stems, an exhaust valve carried by the other of said stems, a spring in said piston rod maintaining said intake valve normally seated in said central valve seat of the piston, means for manually operating said valves, and means to direct compressed air past the intake valve.

11. A control valve for fluid braking systems comprising a cylindrical casing, a piston reciprocatory in said casing, a tubular stem connected to said piston and sliding through one end of the casing, means connecting said stem to a source of fluid supply, a valve seating in said stem and controlling a passage through said piston, a spring urging said valve to its seat, a control element extending through the opposite end of said casing, and means operable by said element within the casing for unseating said valve.

12. A control valve for fluid braking systems comprising a housing, a pair of pistons reciprocatory in said housing to and from each other, said housing forming a fluid pressure chamber between said pistons, one of said pistons being formed with an inlet to and the other with an outlet from said fluid pressure chamber, said housing having an opening into said chamber for connection to a brake line, means for delivering a fluid under pressure to said inlet, means for opposing a predetermined resistance to travel of said inlet forming piston from the other piston, a valve member normally closing said inlet, movable from the inlet-forming piston to an open position and adapted to be closed by a travel of the inlet-forming piston from the other piston, a valve member controlling said outlet, and means for controlling said valve members in common, acting upon the inlet-controlling valve member through the outlet forming piston.

13. A control valve for fluid braking systems comprising a housing, a pair of pistons reciprocatory in said housing to and from each other, said housing forming a fluid pressure chamber between said pistons, one of said pistons being formed with an inlet to and the other with an outlet from said pressure chamber, of said housing having an opening into said chamber for connection to a brake line, means for delivering a fluid under pressure to said inlet, a spring in said housing opposing a predetermined resistance to travel of said inlet-forming piston from the other piston, a valve member normally closing said inlet, movable from the inlet forming piston to an open position and adapted to be closed by a travel of the inlet-forming piston from the other piston, a valve member controlling said outlet, and means for controlling said valve members in common.

14. A control valve for fluid braking systems comprising a housing, a pair of pistons reciprocatory in said housing to and from each other, said housing forming a fluid pressure chamber between said pistons, one of said pistons being formed with an inlet to and the other with an outlet from said chamber, said housing forming a fluid pressure chamber between said pistons, one of said pistons being formed with an inlet to and the other with an outlet from said chamber, said housing having an opening into said chamber for connection with a brake line, means for delivering a fluid under pressure to said inlet, means for opposing a predetermined resistance to travel of the inlet-forming piston from the other piston, a valve member normally closing said inlet, movable from the inlet-forming piston to an open position and adapted to be closed by a travel of the inlet-forming piston from the other piston, a valve member controlling said outlet, a stem carried by the outlet-forming piston projecting toward said inlet valve member, and adapted to unseat the latter through actuation of said outlet-forming piston, and means for actuating the last-named piston.

15. A control valve for fluid braking systems comprising a housing, a pair of pistons reciprocatory in said housing to and from each other, said housing forming a fluid pressure chamber between said pistons, one of said pistons being formed with an inlet to and the other with an outlet from said chamber, said housing having an opening into said chamber for connection with a brake line, means for delivering a fluid under pressure to said inlet, a pair of valve members seating toward each other to respectively control said inlet and outlet, means for initially seating the outlet-controlling valve member and for then actuating the outlet-forming piston toward the other piston, means for unseating the inlet-controlling valve member responsive to travel of the outlet-forming piston toward the other piston, the inlet-controlling valve member being again engageable with its seat, through actuation of the inlet-forming piston from the other piston, and means opposing a predetermined resistance to travel of the inlet-forming piston from the other piston.

16. A control valve for fluid braking systems comprising a housing, a pair of pistons reciprocatory in said housing to and from each other, said housing forming a fluid pressure chamber between said pistons, one of said pistons being formed with an inlet to and the other with an outlet from said chamber, said housing having an opening into said chamber for connection with a brake line, a tubular stem in communication with said inlet and slidable in unison with said inlet-forming piston through an end wall of said housing, means for delivering a fluid under pressure to said stem exteriorly of said housing, means for opposing a predetermined resistance to travel of the inlet-forming piston from the other piston, a valve member normally closing said inlet, movable from the inlet-forming piston to an open position and adapted to be closed by a travel of the inlet-forming piston from the other piston, a valve member controlling said outlet, and means for controlling said valve members in common, acting through one of said valve members upon the other.

17. A control valve for fluid braking systems, comprising a fluid pressure chamber having opposite walls movable to and from each other to expand and contract said chamber, and respectively formed with an inlet to and an outlet from said chamber, means for connecting said chamber with a brake line, means for delivering a fluid under pressure to said inlet, a pair of valve members seating toward each other to respectively control said inlet and outlet, means for initially seating the outlet-controlling valve member and for then actuating the outlet-forming wall toward the opposed wall of the pressure chamber, means for unseating the inlet-controlling valve member responsive to travel of the outlet-forming wall toward the opposed wall, the inlet controlling valve member being again engageable with its seat through travel of the inlet-forming wall from the other wall, and means opposing a predetermined resistance to travel of the inlet-forming wall from the other wall.

18. A control valve for fluid braking systems, comprising a fluid pressure chamber having opposite walls movable to and from each other, and respectively formed with an inlet to and an outlet from said chamber means for connecting said chamber with a brake line, means for delivering a fluid under pressure to said inlet, a pair of valve members seating toward each other to respectively control said inlet and outlet, a steam connected to said outlet-forming wall, projecting into said chamber and adapted to actuate said inlet valve member, a common means for seating said outlet valve member and for actuating said outlet-forming wall toward the inlet-forming wall to unseat the inlet valve member through said stem, the inlet valve member being adapted to again engage its seat responsive to travel of the inlet-forming wall from the outlet-forming wall, and means opposing a predetermined resistance to such travel.

19. A control valve for fluid braking systems, comprising a housing, a pair of pistons reciprocatory in said housing, to and from each other, herein termed the first and second pistons, jointly forming a fluid pressure chamber, means for delivering a fluid under pressure to said chamber, means establishing a brake line connection to said chamber, means for venting fluid from said chamber, a normally unseated valve member controlling the fluid exhaust from said chamber, a common means for manually seating the exhaust-controlling valve member and for actuating the first piston, the second piston being adapted by its travel from the first piston to seat said delivery controlling valve member, and means opposing a predetermined resistance to travel of the second piston from the first one.

20. A control valve for fluid braking systems comprising a housing, means for delivering a fluid under pressure to said housing, means establishing a brake line connection to said housing means for venting fluid from said housing, a valve member controlling the fluid delivery to said housing, means for manually unseating said valve member, means opposing the fluid pressure in said chamber to unseating of said valve member and means for automatically reseating said valve member responsive to a predetermined fluid pressure in said chamber.

21. A control valve for fluid braking systems, comprising a fluid pressure chamber having a fluid outlet and having a ported wall, means for delivering a fluid under pressure to the port of said wall, a valve member normally closing said port, means for manually unseating said valve member, said ported wall being outwardly movable responsive to pressure of fluid within said chamber, and said valve member, when unseated, being engageable with its seat through outward movement of said wall, and means opposing a predetermined resistance to outward movement of said wall.

22. A control valve for fluid braking systems, comprising a fluid pressure chamber having an inlet and an outlet port formed in opposed walls thereof, means for delivering a fluid under pressure to said inlet port, valve members controlling said ports, means for manually controlling said valve members in common, and means coacting with said pressure chamber to effect seating of the inlet-controlling valve member responsive to a predetermined pressure in said chamber.

23. A control valve for fluid braking systems, comprising a fluid pressure chamber, having an inlet and an outlet port formed in opposed walls thereof, means for delivering a fluid under pressure to said inlet port, valve members controlling said ports, means for successively seating the outlet-controlling valve member and unseating the inlet-controlling valve member, and means coacting with said pressure chamber to effect seating of the inlet valve member, responsive to a predetermined rise of pressure in said chamber.

24. A control valve for fluid braking systems, comprising a fluid pressure chamber having opposed walls respectively formed with an inlet and an outlet to said chamber, the outlet-forming wall being movable toward the opposite wall, means for delivering a fluid under pressure to said inlet, a common means for manually closing said outlet and for actuating the outlet-forming wall toward the opposite wall, means for normally closing said inlet, and means for opening said inlet responsive to actuation of the outlet-forming wall toward the opposite wall.

25. A control valve for fluid braking systems comprising a fluid pressure chamber having opposed walls respectively formed with an inlet and an outlet to said chamber, the outlet-forming wall being movable toward the inlet-forming wall, means for delivering a fluid under pressure to said inlet, a common means for manually closing said outlet and for actuating the outlet-forming wall toward the opposite wall, means for normally closing said inlet and means carried by said outlet-forming wall within said chamber for opening said inlet upon actuation of said outlet-forming wall toward the opposite wall.

26. A control valve for fluid braking systems comprising a fluid pressure chamber having opposed walls movable to and from each other and respectively formed with an inlet and an outlet to said chamber, means for delivering a fluid under pressure to said inlet, a common means for closing said outlet and actuating the outlet-wall toward the inlet-wall, a valve member controlling said inlet, means within said chamber for unseating said valve member through inward actuation of the outlet-forming wall, and means opposing a predetermined resistance to outward actuation of the inlet-forming wall, whereby upon a predetermined rise of pressure in said chamber, consequent to unseating of said valve member, reseating of said member is accomplished by outward yielding of the inlet-forming wall.

27. A control valve for fluid braking systems comprising a fluid pressure chamber having opposed walls movable to and from each other, one of said walls being formed with an inlet port, means for delivering a fluid under pressure to said port, a valve member controlling said port, seating inwardly with respect to said pressure chamber, means carried interiorly of the pressure chamber by one of said opposed walls for unseating said valve member responsive to an actuation of one of said walls toward the other, and means opposing a predetermined resistance to actuation of the ported wall outwardly with respect to said chamber, whereby upon a predetermined rise of pressure within said chamber, consequent to unseating of said valve member, reseating of said member is accomplished by outward yielding of said ported wall.

28. A control valve for fluid braking systems, comprising a fluid pressure chamber having an inlet and an outlet port formed in opposed walls thereof, means for delivering a fluid under pressure to said inlet port, valve members seating upon said walls and controlling said ports, a common actuating means for said valve members adapted to successively seat the outlet-controlling valve member and unseat the inlet-controlling valve member.

29. A control valve for fluid braking systems, comprising a fluid pressure chamber having an inlet and an outlet port formed in opposed walls thereof, means for delivering a fluid under pressure to said inlet port, valve members controlling said ports, seating toward each other, the outlet-controlling valve member being adapted for actuation subsequent to its seating toward the other valve member, and means for actuating said valve members in common, effective to seat the outlet-controlling valve member and then actuate it toward the inlet-controlling valve member and acting through the outlet-controlling valve member, after seating thereof, to unseat the inlet-controlling valve member.

30. In a control for fluid braking systems, the combination with an expansible fluid pressure chamber, and means for delivering a fluid under pressure to said chamber and for discharging it therefrom, of means automatically limiting the admission of fluid to said chamber through its expansion in one direction, and means, opposing expansion of said chamber in another direction for exercising manual control of the fluid delivery.

31. In a control for fluid braking systems, the combination with an expansible fluid pressure chamber having an inlet and outlet, and means for delivering a fluid under pressure to said inlet, of means automatically limiting the delivery of fluid to said inlet through expansion of said chamber in one direction, and means opposed by expansion of said chamber in another direction for successively closing said outlet and opening said inlet.

32. In a control for fluid braking systems, the combination with a fluid chamber, means for delivering a fluid under pressure to said chamber, a valve member controlling such delivery, and means acting against pressure in said chamber to unseat said valve member.

33. A control valve for fluid braking systems comprising a casing, having a fluid outlet, a ported piston slidable in said casing at one side of said outlet, means for delivering a fluid under pressure to said outlet through the piston port, a valve member normally closing said piston port, seating in the direction of delivery of said fluid, means for manually unseating said valve member, and means opposing a predetermined resistance to travel of said piston reverse to the direction of fluid delivery, said piston being movable, to reseat said valve member under a fluid pressure in said casing adequate to overcome said predetermined resistance.

34. A control valve for fluid braking systems comprising a housing having a fluid inlet a piston slidable in said housing to and from said inlet, and formed with an outlet, means for delivering a fluid under pressure to said inlet, a common means for manually closing said outlet and for actuating said piston toward said inlet, a valve member normally closing said inlet, and means for unseating said valve member responsive to actuation of said piston toward said inlet.

35. A control valve for fluid braking systems comprising a housing having a fluid inlet, a piston slidable in said housing to and from said inlet and formed with a fluid outlet, means for delivering a fluid under pressure to said inlet, a common means for manually closing said outlet and for actuating said piston toward said inlet, a valve member normally closing said inlet independently of said piston and means carried by said piston for unseating said valve member upon actuation of said piston toward said inlet.

36. A control valve for fluid braking systems comprising a housing, a pair of pistons slidable in said housing to and from each other, forming with said housing a fluid pressure chamber, and respectively formed with an inlet and an outlet to said chamber, means for delivering a fluid under pressure to said inlet, a common means for closing said outlet and actuating the outlet piston toward the inlet piston, a valve member controlling said inlet, means within said fluid pressure chamber for unseating said valve member through actuation of the outlet piston toward the inlet piston, and means opposing a predetermined resistance to actuation of the inlet piston from the outlet piston, whereby upon a predetermined rise of pressure in said chamber, consequent to unseating of said valve member, the latter is adapted to be reseated by fluid pressure responsive travel of the inlet piston.

37. A control valve for fluid braking systems comprising a housing, a pair of pistons slidable in said housing to and from each other, one of said pistons having a port, means for delivering a fluid under pressure to said port, a valve member controlling said port, seating reversely to the direction of fluid delivery, means carried between and by one of said pistons for unseating said valve member, responsive to actuation of one of said pistons toward the other, and means opposing a predetermined resistance to actuation of said ported piston from the other piston, whereby upon a predetermined use of pressure between said pistons consequent to unseating of said valve member, the latter is reseated by fluid pressure responsive travel of said ported piston.

38. A control valve for fluid braking systems comprising a casing, a piston slidable in said casing forming one wall of an expansible pressure chamber in said casing, said piston being formed with an inlet to said pressure chamber, and said casing having an outlet from said chamber, means for delivering a fluid under pressure to said inlet, a spring opposing travel of said piston in a direction to expand said chamber, a valve member controlling said inlet, and means for manually unseating said valve member.

39. A control valve for fluid braking systems comprising a housing, a piston slidable in said casing forming one wall of a fluid pressure chamber in said housing and formed with an outlet from said chamber, a valve member controlling said outlet, means for delivering a fluid under pressure to said pressure chamber, a valve member controlling such delivery, a common means for seating the outlet-controlling valve member and for actuating said piston toward the fluid inlet of the pressure chamber, said means comprising a control member disposed exteriorly of said casing and subject to fluid pressure exerted upon said piston, and means for unseating the inlet-controlling valve member responsive to such actuation of said piston.

40. A control valve for fluid braking systems comprising a housing, a piston slidable in said housing forming one wall of a fluid pressure chamber in said housing and formed with an outlet from said chamber, a valve member controlling said outlet, means for delivering a fluid under pressure to said pressure chamber, a valve member controlling such delivery, a control element freely slidable in an end wall of the housing, adapted through actuation into the housing to seat the outlet-controlling valve member and to actuate said piston toward the fluid inlet to the pressure chamber, and adapted to transmit fluid pressure acting on said piston to the housing exterior, and means for unseating the inlet-controlling valve member responsive to actuation of said piston toward the fluid inlet.

41. A control valve for fluid braking systems, comprising a housing, means for admitting a fluid to said housing and for discharging it therefrom, a valve member in said casing exercising a control of the fluid flow through the housing, a piston slidable in said housing and providing a seat for said valve member, and a control mechanism for said valve member, reacted upon by said piston, responsive to a pressure differential at opposite sides of the piston, and adapted to transmit such reaction exteriorly of the housing.

42. In a fluid braking system, a housing having an opening for connection with a brake line, a piston slidable in said housing at one side of said opening and formed with a port for venting the brake line, a valve member controlling said port, and control means for said valve member, reacted upon by said piston under brake line pressure and adapted to transmit such reaction exteriorly of said housing.

43. In a fluid braking system, a housing having an opening for connection with a brake line, a piston slidable in said housing, at one side of said opening, and formed with a port for venting the brake line, a valve member controlling said port, and a stem for seating said valve member, reacted upon by said piston under brake line pressure when said valve member is seated, and freely slidable in a wall of said housing to provide for control of said valve member from the housing exterior and for transmitting the brake pressure reaction exteriorly of said housing.

44. In a fluid braking system, a fluid pressure chamber having an opening for connection with a brake line and having a wall yieldable under brake line pressure, said wall being ported for venting brake line pressure, of a valve member controlling said port, and control means for said valve member reacted upon by said yieldable wall, when said valve member is seated, and providing for transmission of such reaction exteriorly of said chamber.

45. In a fluid braking system, a brake line pressure chamber having an opening for connection with a brake line and having an opening for admitting an actuating fluid to said chamber, a valve member controlling said fluid admission opening, one wall of said chamber being yieldably responsive to pressure in said chamber and being ported for venting the brake line, a valve member controlling said vent port, and a muscularly actuable common control means for said valve members, adapted to unseat the fluid-admitting valve member upon seating of the vent-controlling valve member, and reacted upon by said yieldable wall under pressure in said chamber to oppose such pressure to the muscular actuating effort.

Signed at Santa Monica, in the county of Los Angeles, State of California, this twentieth day of November, 1928.

ROBERT E. MITTON.